United States Patent Office 3,262,565
Patented July 26, 1966

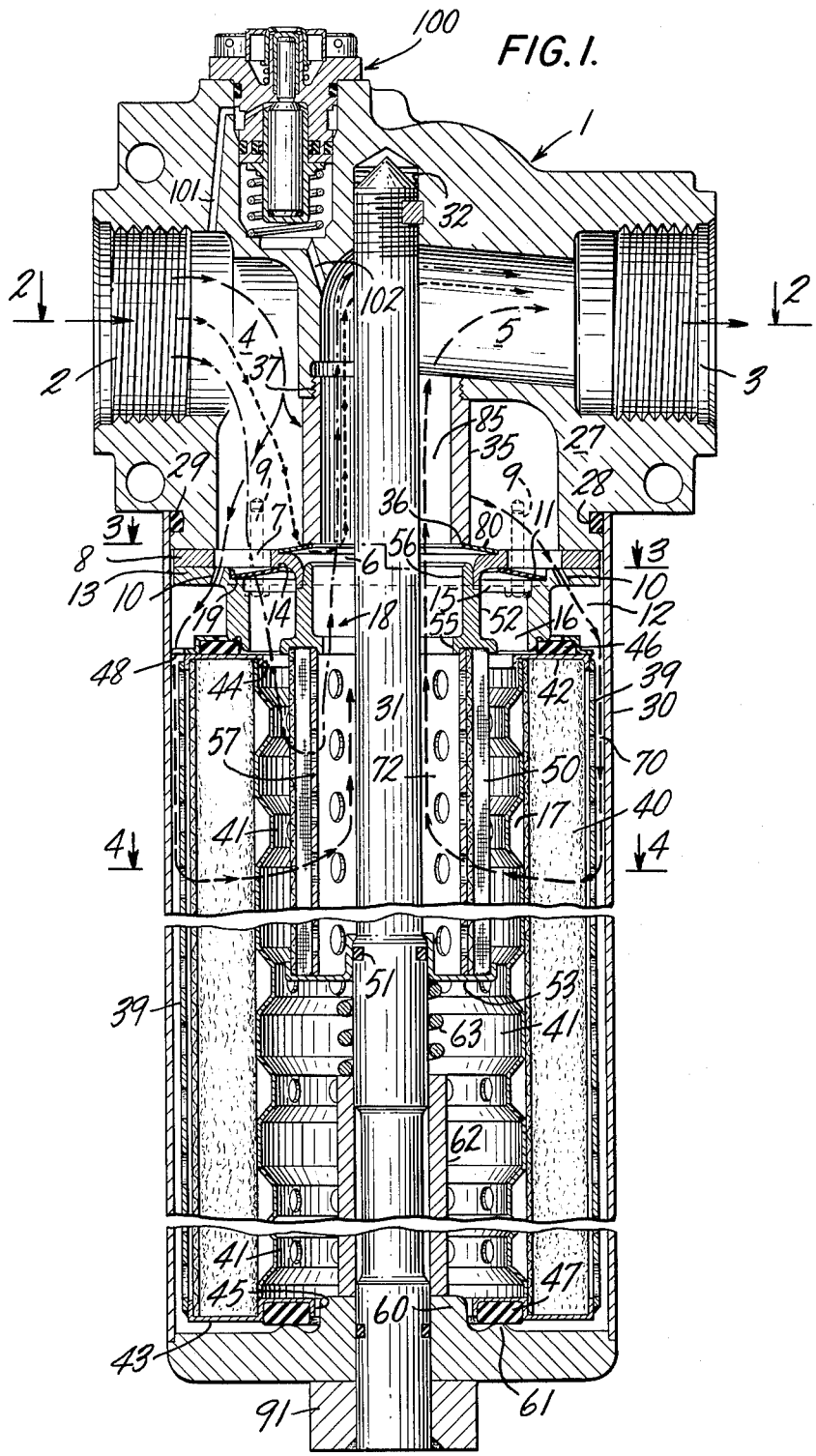

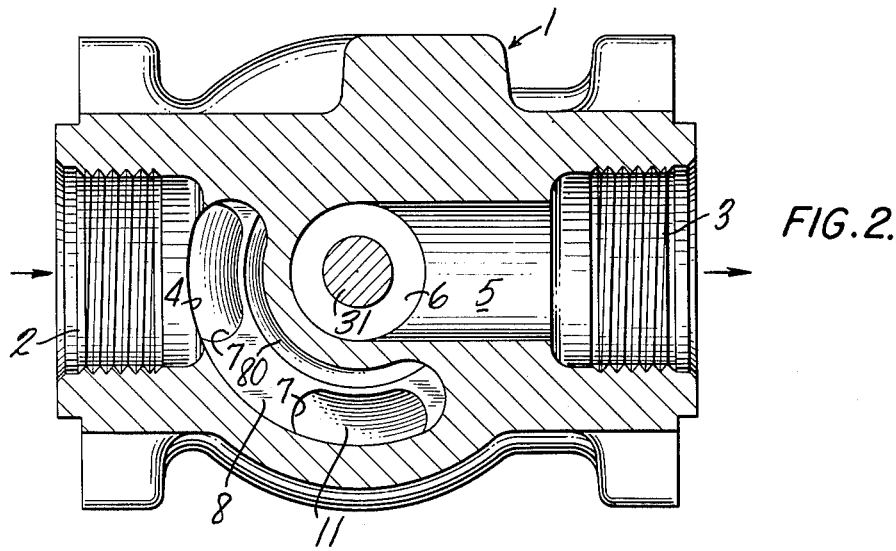
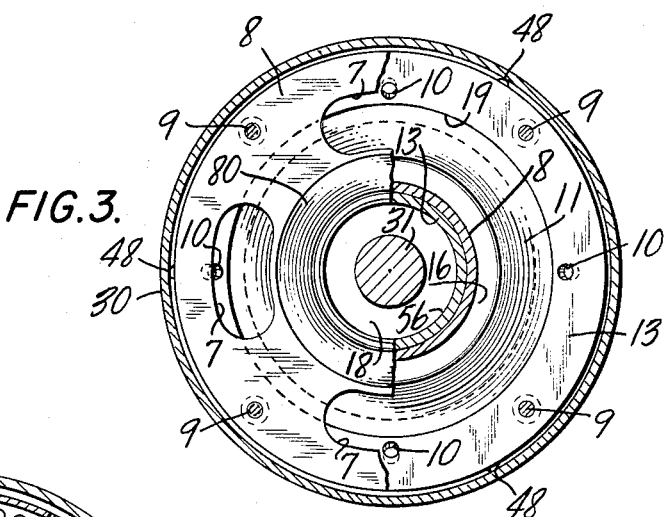
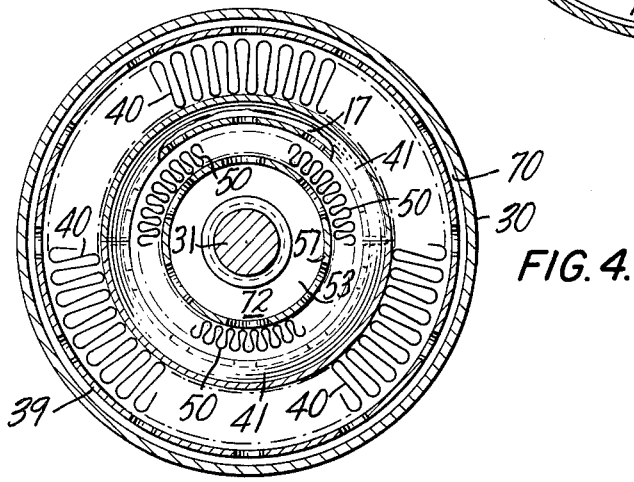

3,262,565
DUAL-VALVE, DUAL-ELEMENT, CONSTANT
FLOW, FILTER ASSEMBLY
Bernard F. Silverwater, Plainview, N.Y., assignor to Pall
Corporation, Glen Cove, N.Y., a corporation of New
York
Filed Aug. 5, 1963, Ser. No. 299,775
12 Claims. (Cl. 210—90)

This invention relates to filter assemblies, and more particularly to filter assemblies especially designed for use with hydraulic systems of aircraft, to remove a substantial proportion of very fine incident particles.

So many extraordinary demands are made upon the hydraulic systems of aircraft, that the surprising thing is not that there is an occasional failure, but that the systems are as effective as they are. The hydraulic fluids used must withstand temperatures ranging from −65° F. to as high as 275° F., and occasionally even higher, and must be completely flowable and operative in the system under these conditions.

Wear and abrasion of parts result in the production of very fine particles, usually less than 5 microns in diameter. While these fine particles are so small that individually they cause no obstruction, there is nonetheless a tendency for sedimentation of such particles in regions where the rate of flow is rather low and for collection of such particles in the small (often 5 microns or less) clearances in servo valves and other components. In the course of time, serious obstructions can be built up even from such small particles. Indeed, it is the very fine particles that are usually responsible for valve failure in such systems, nowadays, since these are the particles not removed by conventional filters. In addition, it is particles of this size that cause wear in pumps since it is only these particles than can readily enter the clearances between the moving parts of a pump.

Maintenance of a clean hydraulic fluid of course requires efficient filtration. In this respect, the fine particles present a special problem, because it is quite difficult to prepare a filter element capable of removing very small particles that has a sufficient flow capacity to meet the flow requirements of the typical aircraft system. In normal flight of a typical commercial helicopter aircraft such as the Chinook, a flow of hydraulic fluid of the order of 4 gallons per minute or less is encountered, but whenever the landing gear is operated, a higher flow rate of 30 g.p.m. is required. Flow capacity of a filter is of course a function of surface area and micron removal ratings and in the limited space requirements of aircraft, it has not until very recently been possible to provide a filter element sufficiently rugged for aircraft hydraulic system service and having a fine enough incident particles removal rating, and a high enough flow capacity, to meet these requirements. The result has been that in aircraft, at least, it has not been possible to design a filter element that is capable of removing a substantial proportion of very fine incident particles.

In accordance with the invention, a filter assembly is provided that is capable of removing a substantial proportion of very fine incident particles, and preferably all incident particles over 3 microns in diameter, and that is capable of supplying a flow rate as high as may be desired, without any real upper limit, except that imposed by conventional filter elements now in use. A filtered flow is provided at all flow rates, but at flow rates in excess of a predetermined maximum, only a portion of the flow is filtered through the primary filter element. The remainder is diverted by a flow control system comprising, in combination, an orifice yielding a predetermined pressure drop and an annular spring disc, through a secondary filter of normal flow capacity but capable only of removing most of the larger incident particles, preferably at least those incident particles over 15 microns in diameter. The normal flow, plus a safe margin, through the primary filter element is the maximum required for normal operational flow in the system in which the element is installed. Only when extraordinary requirements are made upon the flow, beyond this maximum, does the flow control system divert the incremental portion of the flow through the secondary filter element. Since such extraordinary flow requirements are usually made only for short periods, less than 5% of the total flight time, the filter assembly of the invention effectively keeps the hydraulic fluid substantially free from particles larger than will pass the primary filter element, since any such particles that may enter the fluid during the times of extraordinary flow are removed later in the course of normal flow.

As a further feature, the filter assembly of the invention provides for maintenance of a filtered flow through the secondary filter element whenever the primary element is clogged or so obstructed that the flow-through results in a pressure differential across that element above a predetermined minimum. In this event also, the flow control system provided diverts through the secondary filter element flow above that which the partially or fully clogged primary filter element can pass.

A second by-pass is provided for the secondary filter element, so that when this element becomes clogged, or so obstructed as to increase the pressure differential across it to above a predetermined minimum, then all flow through the filter by-passes both the primary and the secondary filter elements. Normally, there is ample time after the primary element has become obstructed for the filter element to be serviced before the secondary filter element becomes clogged. Thus, the second by-pass line would come into use only in the event of an emergency of rather unusual character.

Differential pressure indicators can be provided, indicating the reaching of a predetermined pressure differential across the primary filter element, and across the secondary filter element, so that an indication is given to the operator that the primary or secondary filter element or both have become clogged, and require servicing.

For control of the diversion of fluid from the primary filter element at flow rates above the predetermined maximum, as well as diversion whenever the primary filter element becomes obstructed such that the pressure differential across it reaches a predetermined minimum, there is provided as stated above a flow control system valve comprising, in combination, an orifice yielding a predetermined pressure drop, and a pressure-sensitive annular spring disc valve so designed as to be actuated by an increase in fluid pressure due to an increase in the velocity of flow to the filter assembly. The flow through the orifice is limited to a maximum value, and an increase in flow beyond this maximum results in a predetermined fluid pressure differential which results in opening the pressure-sensitive annular spring disc valve. Since this increase in fluid pressure is proportional to flow, the annular spring disc valve is responsive to changes in flow volume, and consequently to changes in flow demand, made upon the filter assembly of the invention.

The orifice is placed in the line of flow between the inlet to the filter assembly and the primary filter element, and preferably, in an inlet passage, while the annular spring disc valve is placed in the line of flow between the inlet and the secondary filter element.

The orifice considerably reduces the diameter of the passage available for flow, such as in the inlet passage, and as a consequence of this reduction in diameter, there is a substantial increase in velocity head, resulting in a higher pressure drop across the orifice. The annular spring disc valve is desirably spring-biased against a valve seat to reciprocate between open and closed positions, and have its faces exposed to fluid pressures so as to sense differential pressures. The disc is biased in the closed position, and remains stationary, in position against the valve seat, while the flow is within predetermined limits. Under such normal flow conditions, a steady state exists in which the force due to fluid pressure differential on the inlet and outlet sides of the disc is less than will open the disc, and the disc remains stationary. However, when the flow volume increases, and a predetermined pressure drop through the orifice is exceeded, the fluid pressure differential between the inlet and outlet sides of the disc increases, and in time exceeds the biasing force tending to hold the spring disc closed against the inlet flow. The spring disc valve is designed to be opened whenever the fluid pressure differential between the inlet and outlet sides of the disc increases above a predetermined value.

The pressure-sensitive annular spring disc valve is so positioned in the fluid line, such as the inlet passage, as under normal flow conditions to close off a line leading to the secondary filter element. The result is that all flow must pass through the orifice into the primary filter element. At the predetermined fluid pressure differential on the disc valve faces, the minimum value of which is determined by the flow requirements of the system, the disc valve is actuated in a manner to open the passage between the inlet and the secondary filter element.

With appropriate design of the spring disc valve, using known mathematical formulae, it can be made to open to an amount of opening proportional to the magnitude of the fluid pressure, and thus the amount of diversion of flow to the secondary element can be made directly dependent upon the rate of flow. The dimensioning of the orifice is matched with the spring bias force of the disc and the dimensioning of the disc force exposed to fluid pressure, so as to obtain actuation of the disc valve at the predetermined fluid pressure differential.

While the disc valve is open, flow to the primary filter element continues at the normal but maximum rate through the orifice. Thus, at all times, flow is supplied to and through the primary filter element, while it remains unobstructed. Hence, at flow rates above the predetermined maximum, there is flow through both the primary and the secondary filter elements. The filter is thus able to accommodate itself to the increased demand for flow, and all of the flow through the filter assembly is still filtered.

In a preferred embodiment, a relief valve is provided which is actuated whenever the fluid pressure at the inlet exceeds the pressure in the passage to the secondary filter element on the other side of the primary filter element by a predetermined amount. Thus, in the preferred embodiment, whenever the fluid's passage through the primary filter element becomes obstructed, so that the total pressure differential between the inlet passage and the passage to the secondary filter element exceeds a predetermined maximum, the relief valve is actuated, exposing the line to the secondary filter element, by-passing the primary element, and filtered flow continues by way of the secondary filter element, on an emergency basis until the primary element can be serviced.

This relief valve can be the same valve as the annular spring disc valve previously described, and such an embodiment is illustrated in the drawings.

In a further preferred embodiment, a relief valve also is provided which is actuated whenever the fluid pressure at the inlet exceeds the pressure at the outlet or in the passage on the other side of the secondary filter element by a predetermined amount. Thus, whenever the fluid's passage through the primary and secondary filter elements becomes obstructed, so that the total pressure differential between the inlet passage and the outlet passage on the other side of the secondary filter element exceeds a predetermined maximum, the relief valve is actuated, by-passing the primary and the secondary filter elements and unfiltered flow continues on an emergency basis until the filter elements can be serviced.

Preferably, an annular spring disc valve is also used to control relief flow around the secondary filter element in case of plugging or obstruction, to a flow-reducing degree, of the secondary filter element.

The flow control system can be constructed of any durable material inert to the fluid being circulated through the system. Metal orifices and discs, such as those made of aluminum, stainless steel, and other stainless alloys, are preferred, but it is also possible to fabricate the valve system from synthetic polymers and cellulose derivatives, such as polytetrafluoroethylene, polypropylene, polyethylene, polystyrene, nylon, polyoxymethylene, acrylonitrile rubbers, and fluorocarbon rubbers.

The primary filter element of the invention is selected to meet the system requirements for incident particle removal. As has been stated, hydraulic systems of aircraft may require the removal of all incident particles as small as 3 microns in diameter. The particle removal rating of the primary filter element is not critical, and can range from 0.035 to 10 microns or higher, depending on the system parameters.

As the primary filter element, any filter material can be employed. Sheet filter material can be used, such as porous sheets made of paper, fiber mats and felts, plastic membranes, sintered particulate material, and wire mesh and sinter-bonded wire mesh, disclosed in U.S. Patents Nos. 2,925,650 and 3,049,796, in which the wires or particles are made of metals or natural or synthetic plastic materials, such as stainless steel, aluminum, glass, ceramic materials, polyvinyl chloride, polyethylene, polypropylene, polystyrene, and polytetrafluoroethylene.

Because filter materials having such small particle removal ratings have a relatively low flow capacity, it is preferred to form the primary filter element in pleats, convolutions or corrugations, so as to provide a greater surface area in a small volume.

The secondary filter element is selected primarily for flow capacity, so as to pass the maximum required volume of fluid per unit time under the maximum flow demands of the system, and is preferably also selected so as to give the smallest particle removal ratings obtainable at such flow capacity.

The particle removal rating of the secondary filter element is in no way critical, and can range from 3 to 50 microns or higher, depending on the system parameters. Particles passed in flow through the secondary filter element are temporarily in the system, however; the primary filter element normally cleans up such particles during normal flow.

If the primary element is made of material (for example, sintered powder, felt or paper) which may release particles or fibers from its downstream surface, the secondary filter should preferably be fine enough to remove all such particles or fibers.

Secondary filter elements are available which have the required flow capacity. Such elements are made of wire mesh and of sinter-bonded wire mesh such as is described in U.S. Patents Nos. 2,925,650 and 3,049,796, and sinter-bonded wire mesh having a surface layer of sinter-bonded metal particles, such as is described in U.S. Patent No. 3,061,917. Also useful are filter elements made of sinter-bonded metal particles, such as sheets of porous stainless steel and other stainless alloys, bronze, aluminum and steel. Any of the materials described above for use in the primary filter element can also be employed for the secondary filter element, but with a larger pore diameter so as to remove only the larger incident particles, for the required greater flow capacity.

The secondary filter element also preferably is formed in pleats, convolutions or corrugations, for greater surface area.

FIGURE 1 is a longitudinal section through a filter assembly or unit in accordance with the invention, showing the filter head and filter bowl, and the elements disposed therein.

FIGURE 2 is a cross-sectional view of the filter head of FIGURE 1, taken along the lines 2—2 and looking in the direction of the arrows.

FIGURE 3 is a cross-sectional view of the lower head portion of FIGURE 1, taken along the lines 3—3 and looking in the direction of the arrows.

FIGURE 4 is a cross-section of the bowl portion of the filter unit of FIGURE 1, taken along the line 4—4 and looking in the direction of the arrows.

The filter unit shown in the drawings comprises a head 1 provided with a threaded inlet port 2 and a threaded outlet port 3, fitted with suitable pipe connections. Port 2 leads to an internal passage 4. Port 3 serves as the exit for internal passage 5, which extends laterally and then downwardly to a port 6 in the central portion of the lower face of the head 1. Passage 4 likewise extends laterally and then annularly downwardly to an annular port 7 in the external portion of the head. An adaptor ring 8 having ports 6 and 7 is fitted across the bottom of the head 1, and is removably attached to the head by screws 9. A second adaptor ring 13 is attached to the head below ring 8 by the same screws 9.

The flow control system comprises the combination of (1) four orifices 10 disposed in the ring 13 opposite port 7 at the end of passage 4, and introducing a predetermined pressure drop thereacross between passage 7 and space 12, and (2) a pressure-sensitive annular spring disc valve 11, also disposed opposite and normally closing off port 7, controlling flow from passage 4 to the secondary filter element. The orifices 10 open on their inlet side into passage 7 of the adaptor ring 8 and thence to passage 4 of the head, and on their outlet side into space 12 between the ring 13 and the filter bowl 30. The space 12 extends downwardly, leading to the primary filter element.

The pressure-sensitive annular spring disc valve 11 fits snugly on its outer periphery against the side wall of the ring 13 in a ledge 19, and on its inner periphery against the lower face 14 of adaptor ring 8, which is attached to the head by the three screws 9. In the closed position of the valve 11, the disc seats at 14 against the lower face of ring 8. Thus, entry of fluid from passage 4 into passage 15 between ring 8 and ring 13 normally is prevented by the disc 11. When the disc 11 is moved away from the surface 14, passage 16 is opened to flow of fluid from the inlet passage 4 through passage 7 to passage 16 and thence to space 17 between the core 41 of the primary filter element 40, and the secondary filter element 50.

The head 1 has a downwardly extending portion 27, provided with an outside groove 28 in which is disposed an O-ring 29, and to this portion is attached a filter bowl 30 by the central tie rod 31, which is threadably attached to a corresponding socket 32 in the head to provide easy removal of the filter bowl from the head. A leak-proof seal is provided between the upper portion of the filter bowl and the head portion 27 by the O-ring seal 29.

Disposed in the bowl 30 are a primary filter element 40, and a secondary filter element 50. The filter element 40 shown in the drawing is made of a preferred filter material, epoxy resin-impregnated cellulose paper. It can also be of fine wire mesh, coated with a layer of fibrous or particulate material, or a membrane type filter material. The material is in corrugated form, as is best seen in FIGURE 4. The corrugations are supported from within by a cylindrical perforated core 41 of sheet metal, such as aluminum or stainless steel.

The assembly of the corrugated primary filter core and cover is held between upper and lower end caps 42 and 43, respectively. Each of the end caps 42 and 43 is provided with central apertures 44 and 45, respectively. At the inner periphery of each end cap, abutting the central apertures, are sealing gaskets 46 and 47, respectively, which are bonded to or pressed into the end caps.

The opening in the lower end cap 43 is made to fit over the upwardly extending bottom portion 60 of the bowl. The bowl bottom has a raised portion 61, engaging the lower space of the gasket 47 in a leak-proof seal.

The upper end cap 42 has a plurality of peripheral lugs 48 spacing the primary filter element from the bowl 30 to define a space 70 therebetween. The gasket 46 seats at its upper surface against the downwardly extending adaptor ring 13 in a leak-proof seal.

The outer cover 39 surrounding primary filter element 40 and the filter bowl 30 define between them a space 70 just inside the wall of the bowl. The orifices 10 open into the space 12 and thence into the space 70, but the only exit is through filter element 40. It is thus evident that fluid entering through the inlet 2, passages 4 and 7, and orifices 10, into the spaces 12 and 70, can only emerge from the bowl 30 by passing through cover 39, the primary filter element 40, and core 41, in sequence.

The secondary filter element 50 is concentrically disposed within the core 41, at a point spaced therefrom. The port 7 of the head opens via passage 16 directly into this space 17. The secondary filter element is made of a sintered wire mesh, prepared in accordance with U.S. Patents Nos. 2,925,650 and 3,049,796, and having a surface of sinter-bonded fine metal powder, in accordance with U.S. Patent No. 3,061,917. In this case, both the sintered wire mesh and the metal powder are made of stainless steel. This element, which is also in corrugated form, is inwardly supported on core 57, and both element and core are welded or brazed to top and bottom end caps 52 and 53, respectively, in accordance with the process and structure of U.S. Patents Nos. 3,007,579 and 3,007,238.

The bottom end cap 53 has a central opening through which passes the tie rod 31, and is turned inwardly at the opening to engage an O-ring seal 51 on the tie rod 31 in a leak-proof seal. The spacer tube 62 supported on the portion 60 of the bowl surrounds the tie rod 31, and a coil spring 63 abutting against the upper face of the spacer tube surrounds the tie rod and engages the bottom face of end cap 53. The top end cap 52 also has a central opening 55, and extends upwardly towards the head, enclosing a passage 18. At its upper end 56 is disposed the ring 8. The coil spring 63 and ring 8 position the secondary filter element 50 correctly on the tie rod 31 with respect to the head 1, the primary element, and passages 6, 16 and 17.

A relief valve assembly is provided, between passage 4 and passage 5, disposed in the space between ring 8 and a ring 35 of the head threaded into a socket 37 at the beginning of passage 5. The relief valve is composed of a second annular spring disc valve 80. The valve is spring-biased against a sealing surface 36 at the lower face of ring 35 in the passage 85. The disc seals against sealing surface 36, and normally is in the position shown, closing off entry from passage 4 to port 6 and passage 85, and thus the space 72 within the secondary filter element 50, port 6 and exit passage 5 are completely closed off from the entry passage 4, and entry of fluid thereto is obtained only by passage through the secondary filter element 50. Accordingly, while the relief valve 80 is closed, fluid from the inlet passage must pass either through primary filter element 40 or via the spring disc valve 11 and passage 16 to and through the secondary filter element 50 in order to reach exit passage 5 and outlet port 3 of the head 1. Whenever the disc 80 moves away from its seat against the sealing surface 36, however, and this occurs at a predetermined pressure differential across the secondary filter element 50, between passage 4 and space 18 and space 72, a path is opened directly to port 6, passage 85 and thence to passage 5, so that flow can now continue by-passing the primary and secondary filter elements to the outlet port 3 of the head 1. Such flow is an unfiltered flow, in event of an emergency only.

At the bottom wall of the filter bowl 30, there can be provided a drain port fitted in the tie rod 31 and opened by turning the hexagonal nut 91 of the tie rod to partially remove the rod from its socket 32. In this manner, when removal of the bowl is required for servicing of the filter elements 40 and 50 or other parts of the filter unit, the bowl can be drained of fluid before removing the bowl.

Also provided in the head 1 is a pressure indicator 100. This indicator preferably is of the magnetic type, as described and claimed in U.S. Patent No. 2,942,572, issued June 28, 1960. Indicator 100 is connected by line 102 to outlet passage 5 of the head, on the other side of the two filter elements, and by passage 101 with inlet passage 4 of the head, and thus detects any pressure differential in excess of a predetermined maximum between passages 4 and 5. It will thus give a signal whenever a predetermined minimum pressure differential, say 100 p.s.i., between these two passages has been exceeded. Passage 5 is on the outlet side of the secondary filter element 50, and thus indicator 100 will give a warning only whenever both the primary and the secondary filter elements have become plugged. When this occurs, the pressure differential across them can reach the level at which indicator 100 is actuated.

Inasmuch as the valve 11 provides a bypass of the primary filter element 40, whenever the predetermined pressure differential across the primary element has been exceeded, and then filtered flow continues via the secondary filter element, no indicator is required to show when that filter element has been plugged or sufficiently obstructed so as to reduce flow therethrough to below the predetermined minimum. However, such an indicator can be provided, if desired, arranged to detect pressure differentials between passage 4 and space 17.

The various paths of flow of fluid through the filter unit under the varying flow rates in the system can now be understood. Normally, at all flow rates below a predetermined maximum, say 7 to 9 gallons per minute, fluid to be filtered enters the filter unit at port 2, proceeding through passage 4 of the head, and then emerging from the head at port 7 through the orifices 10 to passage 12 of the head, thence into the space 70 between the exterior of the primary filter element 40 and the inner wall of the bowl 30. It then passes through the primary filter element 40 and the internal core 41, emerging into the space 17 between the core 41 and the secondary filter element 50. Next, it passes through the secondary filter element 50 into the space 72 enclosed by the secondary filter element and then into the space 18 enclosed by end cap 52, emerging from the bowl 30 at port 6 into the passage 85 and thence into exit passage 5 of the head, leaving the filter unit at outlet port 3.

Inasmuch as the primary filter element 40 removes small particles, and the secondary filter element only the larger particles, in this normal line of flow the secondary filter element provides no effective contaminant filtering action. It can, however, prevent migration of any material that may become detached from the primary filter element 40.

Thus, in normal flow the filter unit is operating at the maximum particle removal rating, and no particles which have a diameter in excess of 3 microns will pass the filter unit. This efficient operation is obtained at all normal flow rates below the predetermined maximum at which the disc valve 11 is actuated.

Whenever a higher flow capacity is required in the system, the pumps operating the fluid will of course provide more flow, and the rate of flow of fluid to the filter unit at inlet 2 will increase. As the rate of flow into the filter unit increases, the predetermined pressure differential across the orifices 10 is reached, with the result that the pressure differential is reached at which the pressure-sensitive annular spring disc valve 11 is set to open, and the disc 11 moves away from its seat 14, thus exposing passage 16 to fluid flow. While this is occurring, flow continues through the orifices 10 at the normal maximum volume of, say 7 to 9 gallons per minute. Accordingly, the excess fluid flow now passes disc 11 into and through passage 16 into passage 17, between the primary and secondary filter elements. Thus, the excess flow bypasses the primary filter element 40, and, passing through only the secondary filter element 50, emerges into the passage 72 enclosed by the secondary filter element, thence leaving the filter bowl 30 at port 6 via passages 85 and 5. In the course of such flow, it is thoroughly mixed with the filtered flow which continues to pass through the primary filter element 40. The fluid now delivered by the filter unit to the system is therefore composed of fluid passing through the primary filter element, and thus effectively stripped of all particles more than 3 microns in diameter, together with flow passing only through the secondary filter element, and stripped only of particles in excess of 15 microns in diameter.

The system can tolerate such a mixed flow for a considerable period of time, but as a matter of fact this flow is continued only for so long as the excess flow demand is made upon the system. As soon as the flow demand diminishes, and the volume of fluid and rate of flow is restored to normal, the pressure differential across the orifices 10 is correspondingly decreased. When the fluid pressure differential has been reduced to below that at which the pressure-sensitive spring disc valve 11 is opened, the valve returns to its seat 14. Passage 16 is accordingly closed off, and all flow by-passing the primary filter element ceases. All the filtered flow accordingly is subjected to the action of the primary filter element 40, and all particles in the system larger than 3 microns in diameter are now removed. Since all of the fluid circulating in the system is eventually recirculated through the primary filter element, any particles which may have escaped the secondary filter element because they are smaller than can be removed thereby, that is, any having a particle size within the range from 15 microns down to 3 microns, will now be removed from the fluid by the action of the primary filter element. Thus, the presence of such particles in the fluid is only temporary, during the period of excess flow requirements.

In the course of use, as the amount of material removed by the primary filter element increases, flow through the primary filter element becomes obstructed. As this happens, the fluid pressure differential across the disc valve 11 increases, due to the reduction in flow volume through and on the other side of the primary filter element. This results in a corresponding increase in the pressure differential across the valve 11 between passage 4 and passage 16, which communicates with the space 17 between the primary and secondary filter elements. Eventually the fluid pressure or force applied to the valve 11 exceeds the predetermined pressure at which the valve disc 11 will open, and the disc is then pushed away from the seat 14, thus exposing passage 16 to the flow of fluid. If desired, the spring disc 11 can be designed so that the amount of opening can be proportional to the differential fluid pressure upon the disc. Thus, flow can continue through the primary filter element for as long a period as possible, until it is plugged completely. At this point, or shortly before, the valve 11 is then fully opened, and all flow bypasses the primary filter element to pass only through the secondary filter element. Up until that point, only a portion of the flow passes through, but a sufficient proportion to maintain the required flow volume to be delivered at the outlet port 3.

If desired, with the plugging of the primary filter element 40, and the corresponding reduction in pressure observed in passage 16, the pressure differential thus produced could be detected by a differential pressure indicator, which, at a pressure differential at or preferably just short of the time of opening of the valve 11 to expose passage 16, could signal that the primary filter element is clogged. Thus, the operator would be made aware of the condition requiring his attention at or before the time when the secondary filter element is put into service, bypassing the primary filter element.

Flow through the secondary filter element 50 into space 72 will continue until the secondary filter element becomes clogged. In the unlikely event that this should occur, the spring disc valve 80 provides a by-pass around the secondary filter element 50. As the secondary filter element 50 becomes obstructed, due to the removal of contaminants, the pressure differential between passage 4 and passage 18 communicating with space 72 will increase, and eventually it reaches the point at which the disc 80 is forced away from its seat 36, opening a passage from passage 4 to passage 18. Just before the pressure reaches that point, the change in pressure between passage 4 of the head, and passage 18, which is in direct connection with passage 5 of the head, is detected by the pressure indicator 100, which is in direct communication therewith through passage 101 and passage 102, respectively. Accordingly, a signal is given at a pressure differential just before the pressure differential required to open the disc valve 80. The operator now sees the signal of the pressure indicator 100, and knows that both filter elements of the filter unit are out of service, so that servicing of the unit is imperative if satisfactory operation of the hydraulic system is to be continued.

Any type of relief valve can be used in place of the spring disc valve 80, such as a poppet and spring type valve.

The annular spring discs of the invention are in the form of a disc bowed against the direction of flow, and open fully at a predetermined pressure differential. The flow-through required is provided by so dimensioning the disc and valve seat as to give an annular opening of the predetermined flow capacity when the disc cracks open. Disc thickness, amount of bow, disc diameter and annular opening diameter are determined by the pressure differential to be resisted, i.e., the resistance to be offered by the spring action of the disc, and the flow capacity needed at a given pressure differential.

The spring discs of the invention are made of material of high yield strength and high hardness. Materials having minimum yield strengths of 30,000 to 400,000 p.s.i. can be used, with Rockwell hardness of the order of C–45. Steel, stainless steel, and nickel chromium alloys are satisfactory, as also are certain synthetic resins such as polytetrafluoroethylene and polyoxymethylene. Metal discs surfaced with polymeric synthetic resins or elastomeric compounds to improve seating of the seals also can be used.

The discs can be uniform in thickness throughout or can vary in thickness, thinner at the center than at the edge, to give improved flexing and sealing.

Fluid flow conditions of all kinds can be met by appropriate design of the spring discs to any load-deflection characteristics required in the system. The geometry of these discs is established by the discs' outside diameter and inside diameter, its free height measured from the inside edge (along the perpendicular to the outside edge) and its thickness. Proper selection of the geometry, using mathematical tables and equations or Fortini, Machine Design, September 4, 1958, "Conical-Disc Springs" will give a disc capable of pressure-relieving response to any type of load in any desired way.

The following is claimed:

1. A filter assembly comprising a housing having inlet and outlet passages; a primary filter element disposed in the housing; a primary passage leading from the inlet only to the primary filter element; a secondary filter element disposed in the housing and located adjacent to and downstream of the downstream portion of said primary filter element; a secondary passage leading from the inlet to the secondary filter element, and a flow control valve assembly comprising an orifice disposed in the primary passage to direct all normal flow to and through the primary filter element, the primary filter element receiving fluid in a predetermined quantity for filtration at all times via the orifice, and delivering filtered fluid for delivery at the outlet passage of the housing, and a pressure-sensitive spring disk valve, disposed in the housing across the secondary passage and normally closing off flow to the secondary filter element through the secondary passage, but responsive to a predetermined fluid pressure differential between the primary passage and the secondary passage caused by an excessive volume of flow through the orifice, to open and allow such excess flow to pass directly to and through the secondary filter element, while continuing normal flow to and through the primary filter element via the orifice, so that both normal and excess flow through the filter assembly are filtered, and normally no unfiltered flow passes directly to the secondary filter element.

2. A filter assembly in accordance with claim 1 including a relief valve set to open at a predetermined pressure differential across the secondary filter element, by-passing the secondary filter element whenever the secondary filter element becomes obstructed and the pressure differential thereacross exceeds the predetermined value.

3. A filter assembly in accordance with claim 2 in which the relief valve is in the form of a spring disc valve.

4. A filter assembly in accordance with claim 1 in which the primary filter element has up to a 5 micron particle removal rating, and the secondary filter element has up to a 15 micron particle removal rating.

5. A filter assembly in accordance with claim 1 comprising a plurality of orifices.

6. A filter assembly in accordance with claim 1 wherein the spring disc valve comprises an annular Belleville spring disc.

7. A filter assembly in accordance with claim 1 wherein the primary filter element is made of resin-impregnated paper and the secondary filter element is made of sintered wire mesh having a surface of metal particles sinter-bonded thereto.

8. A filter assembly in accordance with claim 1 wherein the primary filter element is made of wire mesh, and the secondary filter element is made of wire mesh.

9. A filter assembly in accordance with claim 8 wherein at least one of the primary filter elements, and the secondary filter element, is made of wire mesh having a surface of particulate material bonded thereto.

10. A filter assembly in accordance with claim 1 including a differential pressure indicator for detecting and indicating a pressure differential across the secondary filter element greater than a predetermined minimum.

11. A filter assembly in accordance with claim 1 including a differential pressure indicator for detecting and indicating a pressure differential across both the primary and the secondary filter elements greater than a predetermined minimum.

12. A filter assembly comprising a housing having an inlet and an outlet, a primary filter element disposed in the housing, a primary passage leading from the inlet only to the primary filter element, an orifice disposed in the primary passage, the orifice delivering fluid to the primary filter element at all times in a predetermined amount, such that all fluid for filtration under normal conditions first passes through the orifice and thence passes to and through the primary filter element, a secondary filter element disposed concentrically within the primary filter element, normally receieving filtered flow from the primary filter element and delivering filtered flow to the outlet passage of the housing, a secondary passage leading from the inlet to the secondary filter element, and an annular frustoconical pressure-sensitive spring disc valve, disposed across the secondary passage and normally closing off flow directly to the secondary filter element, the pressure-sensitive valve being responsive to a predetermined excess fluid pressure caused by excessive flow in the inlet passage to open and allow such excess flow to bypass the primary filter element and proceed directly to the secondary filter element, while continuing normal flow to and through the primary filter element via the orifice, so that both normal and excess flow through the filter assembly are filtered, and normally no unfiltered flow passes directly to the secondary filter element.

References Cited by the Examiner

UNITED STATES PATENTS

| | | | |
|---|---|---|---|
| 2,056,756 | 10/1936 | Weidhofft | 210—133 |
| 2,076,935 | 4/1937 | Burckhalter | 210—132 |
| 2,612,270 | 4/1952 | Lewis et al. | 210—315 |
| 2,937,756 | 5/1960 | Humbert | 210—130 X |
| 3,000,505 | 9/1961 | Scavuzzo | 210—132 |
| 3,040,894 | 6/1962 | Pall | 210—90 |
| 3,120,490 | 2/1964 | Samson | 210—132 |
| 3,164,164 | 1/1965 | Pall et al. | 251—75 X |

REUBEN FRIEDMAN, *Primary Examiner.*

F. A. SPEAR, *Assistant Examiner.*